United States Patent Office 3,809,696
Patented May 7, 1974

3,809,696
DIGLYCIDYL COMPOUNDS CONTAINING TWO N-HETEROCYCLIC RINGS
Daniel Porret, Binningen, and Willy Fatzer, Bottmingen, Switzerland, assignors to Ciba-Geigy AG, Basel, Switzerland
No Drawing. Filed Nov. 9, 1971, Ser. No. 197,145
Claims priority, application Switzerland, Nov. 18, 1970, 17,026/70
Int. Cl. C07d 49/32, 51/30
U.S. Cl. 260—256.4 C
6 Claims

ABSTRACT OF THE DISCLOSURE

Diglycidyl esters are produced by the reaction, in a known manner, of dicarboxylic acids of binuclear N-heterocyclic compounds, e.g. 1,6 - bis[1' - (β - carboxyethyl) - 5',5' - dimethylhydantoinyl - 3']-hexane, with epihalogenhydrin, e.g. epichlorohydrin.

Example: The new compound

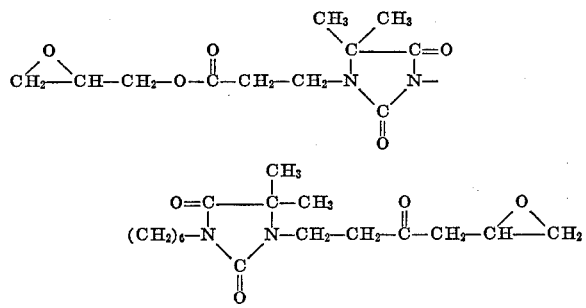

The new diglycidyl esters can be easily cured with all known epoxide resin curing agents, and are suitable for the production of coatings and moulded shapes having good mechanical properties.

---

The present invention relates to new diglycidyl esters of the general formula:

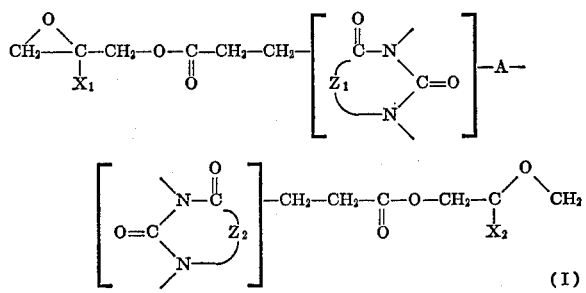

wherein $Z_1$ and $Z_2$ each represent, independently of each other, a nitrogen-free bivalent radical necessary for the completion of a five- or six-membered, unsubstituted or substituted heterocyclic ring; A stands for a bivalent aliphatic, cycloaliphatic or araliphatic radical, and preferably for an alkylene radical, or for an alkylene radical interrupted by oxygen atoms; and $X_1$ and $X_2$ each represent a hydrogen atom or a methyl group.

The radical Z in Formula I consists preferably only of carbon and water, or of carbon, hydrogen and oxygen. It can be, e.g. a radical of the formulae:

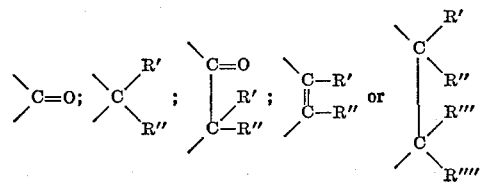

whereby R', R'', R''', and R'''' can each represent, independently of each other, a hydrogen atom or, e.g. an alkyl radical, an alkenyl radical, a cycloalkyl radical, or an optionally substituted phenyl radical.

The new diglycidyl esters of Formula I can be produced by the reaction in a manner known per se, in a single stage or in several stages, of dicarboxylic acids of the general formula:

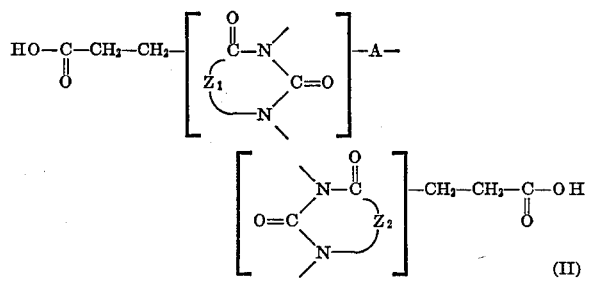

wherein $Z_1$, $Z_2$ and A have the same meaning as in Formula I with an epihalogenhydrin or a β-methylepihalogenhydrin, such as, e.g. epichlorohydrin, β-methylepichlorohydrin, or epibromohydrin.

In the case of the single-stage process, the reaction of epihalogenhydrin with a compound of Formula II is performed in the presence of alkali preferably used being sodium or potassium hydroxide. In this single-stage process, the epichlorohydrin being reacted according to the process can be completely or partially substituted by dichlorohydrin, which is converted in an intermediate step, under the conditions of the process and with a corresponding alkali addition, to epichlorohydrin, reacting then as such with the dicarboxylic acid of Formula II. With respect to the preferably applied two-stage process, the compound of Formula II is, in the first stage, added with an epihalogenhydrin, in the presence of acid or basic catalysts, to the halogenhydrin ester, this being subsequently dehydrohalogenated in the second stage, by means of alkalis such as potassium or sodium hydroxide, to the glycidyl ester.

The new glycidyl esters of Formula I according to the invention are preferably produced by the reaction of an epihalogenhydrin, preferably epichlorohydrin, in the presence of a basic catalyst, such as preferably a tertiary amine or a quaternary ammonium base or a quaternary ammonium salt, with a compound of Formula II, the obtained product containing halogenhydrin groups being then treated with agents eliminating halogen hydride.

Particularly suitable basic catalysts for the addition of epichlorohydrin are tertiary amines such as triethylamine, tri-n-propylamine, benzyldimethylamine, N,N-dimethylaniline and triethanolamine; quaternary ammonium bases such as benzyltrimethylammonium hydroxide; quaternary ammonium salts such as tetramethylammonium chloride, tetraethylammonium chloride, benzyltrimethylammonium chloride, benzyltrimethylammonium acetate, methyltriethylammonium chloride; also ion exchanger resins having tertiary or quaternary amino groups; also trialkylhydrazonium salts such as trimethylhydrazonium iodide.

Further catalysts which are suitable are low molecular thio ethers and sulphonium salts, or compounds which can pass over with the epihalogenhydrins into thio ethers or into sulphonium compounds, such as hydrogen sulphide, sodium sulphide, or mercaptans.

Examples of such thioethers and sulphonium salts are: diethyl sulphide, β-hydroxyethyl ethyl sulphide, β-hydroxypropylethyl sulphide, ω-hydroxy-tetramethyleneethyl sulphide, thiodiglycol, mono-β-cyanoethylthioglycol ether, dibenzyl sulphide, benzyl ethyl sulphide, benzyl butyl sulphide, trimethyl sulphonium iodide, tris(β-hydroxyethyl)-sulphonium, chloride, dibenzyl methyl sulphonium bromide, 2,3-epoxypropyl methyl ethyl sulphonium iodide, dodecylmethyl sulphide, dithiane.

For dehydrohalogenation are used, as a rule, strong alkalis such as anhydrous sodium hydroxide, or aqueous sodium hydroxide solution; but it is also possible to use other alkaline reagents such as potassium hydroxide, barium hydroxide, calcium hydroxide, sodium carbonate or potassium carbonate.

Dehydrohalogenation can, for its part, be performed in several stages. The process can entail firstly treatment at elevated temperature with solid sodium or potassium hydroxide and then, after the excess epihalogenhydrin has been distilled off, heating in an inert solvent with an excess of concentrated alkali hydroxide solution, e.g. 50% sodium hydroxide solution.

Suitable epihalogenhydrins are epibromohydrin, β-methylepichlorohydrin and, in particular, epichlorohydrin. Good yields are obtained by the use of an excess of epichlorohydrin, and preferably 4 to 40 moles of epichlorohydrin per hydroxyl or NH-group. During the first reaction stage, before the addition of alkali, there already occurs a partial epoxidation of the bischlorohydrin ester of a compound of Formula II. The epichlorohydrin, which acts as a hydrogen chloride acceptor, is thereby partially converted into glycerin dichlorohydrin. This is then regenerated, during the treatment with alkali, to form again epichlorohydrin.

The dicarboxylic acids of the General Formula II are obtained in a known manner by the cyanoethylation of binuclear N-heterocyclic compounds of the general formula:

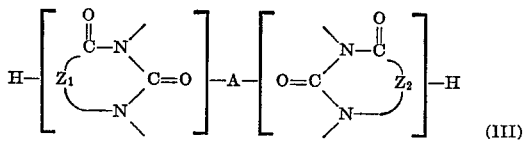

wherein $Z_1$, $Z_2$ and A have the same meaning as in Formula I by addition of acrylonitrile, the obtained di-(β-cyanoethyl)-derivatives being then hydrolysed to dicarboxylic acid; this occurs easily and in good yield. The dicarboxylic acid of Formula II is usually solids, which can be purified by recrystallization.

The binuclear N-heterocyclic compounds of Formula III used for the production of dicarboxylic acids of Formula II are, in particular, bis-(hydantoin)-compounds or bis-(dihydrouracil)-compounds, in which the two N-heterocyclic rings are bound by way of an alkylene bridge, e.g. a methylene group which is bound to each endocyclic nitrogen atom of the respective heterocyclic rings.

The first class of such bis-(hydantoin)-compounds corresponds to the general formula:

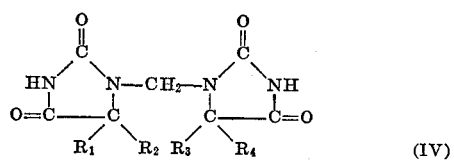

wherein $R_1$, $R_2$, $R_3$ and $R_4$ each represent a hydrogen atom or a lower alkyl radical having 1 to 4 carbon atoms, or wherein $R_1$ and $R_2$ or $R_3$ and $R_4$ together form a tetramethylene or pentamethylene radical.

Mentioned as examples are: 1,1'-methylene-bis - (5,5-dimethylhydantoin), 1,1' - methylene - bis - (5-methyl-5-ethylhydantoin), 1,1'-methylene-bis-(5-propylhydantoin), 1,1'-methylene-bis(5-isopropylhydantoin).

A further class of such bis-(hydantoin)-compounds corresponds to the general formula:

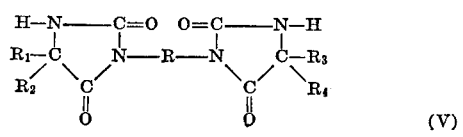

wherein R is an aliphatic, cycloaliphatic or araliphatic radical, particularly an alkyl radical, or an alkylene radical interrupted by oxygen atoms, and R, $R_2$, $R_3$ and $R_4$ each represent a hydrogen atom, or a lower alkyl radical having 1 to 4 carbon atoms, or wherein $R_1$ and $R_2$ and/or $R_3$ and $R_4$ together form a tetramethylene or pentamethylene radical. Mention is made of the following: bis - (5,5 - dimethylhydantoinyl-3) - methane, 1,2-bis-(5',5' - dimethylhydantoinyl-3') - ethane, 1,4-bis-(5',5'-dimethylhydantoinyl-3')-butane, 1,6 - bis-(5',5'-dimethylhydantoinyl - 3')hexane, 1,12 - bis - (5',5' - dimethylhydantoinyl - 3') - dodecane, β,β - bis-(5',5 - dimethylhydantoinyl-3')diethyl ether.

A preferably used class of bis-dihydrouracil)-compounds corresponding to the general formula:

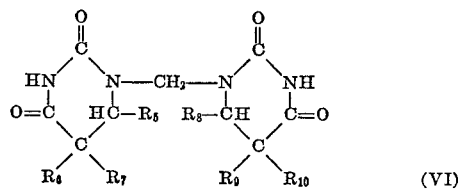

wherein $R_5$, $R_6$, $R_7$, $R_8$, $R_9$ and $R_{10}$ each represent, independently of each other, a hydrogen atom, or a lower alkyl radical having 1 to 4 carbon atoms.

Examples mentioned are: 1,1'-methylene-bis-(5,6-dihydrouracil), 1,1' - methylene - bis - (6 - methyl - 5,6-dihydrouracil) and 1,1'-methylene-bis-(5,5-dimethyl-5,6-dihydrouracil).

The new diglycidyl ethers of Formula I according to the invention react with the usual curing agents for polyepoxide compounds, and they can thus be cross-linked and cured by the addition of such curing agents in a manner analogous to that for other polyfunctional epoxide compounds and epoxide resins. Basic or acid compounds come into consideration as curing agents.

Mentioned as suitable curing agents are, e.g.: amines or amides, such as aliphatic, cycloaliphatic or aromatic, primary, secondary and tertiary amines, e.g. monoethanolamine, ethylenediamine, hexamethylenediamine, trimethylhexamethylenediamine, diethylenetriamine, triethylenetetramine, tetraethylenepentamine, N,N - dimethylpropylenediamine - 1,3, N,N - diethylpropylenediamine - 1,3, bis - (4 - amino - 3 - methyl-cyclohexyl)-methane, 3,5,5-trimethyl - 3 - (aminomethyl) - cyclohexylamine ("isophoronediamine"), Mannich bases such as 2,4,6-tris-(dimethylaminomethyl) - phenol; m - phenylenediamine, p-phenylenediamine, bis-(4-aminophenyl)-methane, bis-(4-aminophenyl) - sulphone, m-xylylenediamine; N - (2-aminoethyl) - piperazine; adducts of acrylonitrile or monoepoxides, such as ethylene oxide or propylene oxide, with polyalkylenepolyamines such as diethylenetriamine or triethylenetetramine; adducts from polyamines, such as diethylenetriamine or triethylenetetramine, in excess and polyepoxides such as diomethanepolyglycidyl ethers; ketimines, e.g. from acetone or methyl ethyl ketone and bis(p-aminophenyl)-methane; adducts from monophenols or polyphenols and polyamines; polyamides, especially those from aliphatic polyamines such as diethylenetriamine or triethylenetetramine, and di- or trimerisated unsaturated fatty acids such as dimerisated linseed oil fatty acid ("Versamid"); polymeric polysulphides ("Thiokol"); dicyanodiamide, aniline/formaldehyde resins; polyvalent phenols, e.g. resorcin, 2,2-bis-(4-hydroxyphenyl)-propane or phenol/formaldehyde resins; boron trifluoride and complexes thereof with organic compounds such as BF₃-ether complexes and BF₃-amine complexes, e.g. BF₃-monoethylamine complex; acetoacetanilide-BF₃-complex; phosphoric acid; triphenylphosphite; polybasic carboxylic acids and their anhydrides, e.g. phthalic acid anhydride, Δ⁴-tetrahydrophthalic acid anhydride, hexahydrophthalic acid anhydride, 4-methyl-hexahydrophthalic acid anhydride, 3,6-endomethylene - Δ⁴ - tetrahydrophthalic acid anhydride, methyl - 3,6 - endomethylene - Δ⁴ - tetrahydrophthalic acid anhydride (=methylnadicananhydride), 3,4,5,6,7,7-hexachloro - 3,6 - endomethylene - Δ⁴ - tetrahydrophthalic acid anhydride, succinic acid anhydride, adipic acid anhydride, azelaic acid anhydride, sebaccic acid anhydride, maleic acid anhydride, dodecenylsuccinic acid anhydride; pyromellitic acid dianhydride, or mixtures of such anhydrides.

In the curing process, it is also possible to use curing accelerators; with the use of polyamides, dicyanodiamide, polymeric polysulphides or polycarboxylic acid anhydrides as curing agents, suitable accelerators are, e.g. tertiary amines, their salts or quaternary ammonium compounds, e.g. 2,4,6 - tris - (dimethylaminomethyl)-phenol, benzyldimethylamine, 2 - ethyl - 4 - methyl - imidazole, 4-aminopyridine, triamylammonium phenolate; also alkali metal alcoholates, such as, e.g. sodium hexanetriolate. In the case of amine curing, it is possible to use as accelerators, e.g. mono- or polyphenols such as phenol or diomethane, salicylic acid or thiocyanates.

Optionally, use can also be made of known reactive diluents such as, e.g. styrene oxide, butylglycidyl ether, isoctylglycidyl ether, phenylglycidyl ether, cresylglycidyl ether, glycidyl esters of synthetic, highly-branched, and in the main tertiary aliphatic monocarboxylic acids ("Cardura E").

The expression "curing," as it is employed here, means the transformation of the aforesaid diepoxides into insoluble and unmeltable, cross-linked products, this occurring, as a rule, with simultaneous moulding of the material to give moulded shapes such as cast objects, pressed objects, or laminates and such like, or to give "flat-shaped articles" such as coatings, lacquer films, or bonds (adhesives).

Depending on the choice of curing agent, curing can be carried out at room temperature (18–25° C.), or at elevated temperature (e.g. 50–180° C.)

The curing operation can optionally be performed also in two stages by firstly prematurely interrupting the curing reaction, or by carrying out the first stage at only moderately elevated temperature, whereupon a curable precondensate (known as the "B-stage") which is still meltable and soluble is obtained from the epoxide component and the curing-agent component. Such a precondensate can be used, e.g. for the production of "prepregs," moulding materials or sinter powders.

The present invention also relates, therefore, to curable mixtures which are suitable for the production of moulded articles, including flat-shaped articles, and which contain the diglycidyl esters according to the invention, optionally together with other di- or polyepoxide compounds, and also curing agents for epoxide resins, such as polyamines or polycarboxylic acid anhydrides.

To the diepoxides according to the invention, or to mixtures thereof with other polyepoxide compounds and/or curing agents, it is possible to add before curing, in any particular phase, the usual modifying agents such as extenders, fillers and toughening agents, pigments, dyestuffs, organic solvents, softeners, flow control agents, thixotropic agents, fire-retarding agents, and mould-release agents.

Examples of extenders, toughening agents, fillers and pigments which can be used in the curable mixtures according to the invention are as follows: coal tar, bitumen, textile fibres, glass fibres, asbestos fibres, boron fibres, carbon fibres, cellulose, polyethylene powders, polypropylene powders: quartz flour; mineral silicates such as mica, asbestos flour, slate flour; kaolin, aluminium oxide trihydrate, chalk flour, gypsum, antimonous trioxide, bentone, silicic acid aerogel ("Aerosil"), lithopone, heavy spar, titanium dioxide, soot, graphite, oxide dyes such as iron oxide or metal powder such as aluminium powder or iron powder.

Suitable organic solvents for the modification of the curable mixtures are e.g. toluene, xylene, n-propanol, butylacetate, acetone, methyl ethyl ketone, diacetone alcohol, ethylene glycol monomethyl ether, -monoethyl ether and -monobutyl ether.

As softeners for the modification of the curable mixtures it is possible to use, e.g. dibutyl-, dioctyl- and dinonylphthalate, tricresylphosphate, trixylenephosphate, and also polypropylene glycols.

As flow control agents on application of the curable mixtures, especially in the case of surface protection, it is possible to add, e.g. silicones, cellulose acetobutyrate, polyvinylbutyral, waxes, stearates (which in some cases are also used as mould-release agents).

Specially for application in the lacquer field, it is also possible for the diepoxide compounds to be partially esterified, in a known manner, with carboxylic acids such as, in particular, higher unsaturated fatty acids. It is moreover possible to add to such lacquer-resin compositions other curable synthetic resins, e.g. phenolasts or aminoplasts.

The curable mixtures according to the invention can be produced, in the usual manner, with the aid of the usual mixing aggregates (stirrer, kneader, rollers).

The curable epoxide resin mixtures according to the invention are used, in particular, in the field of surface protection, in electrical engineering for laminating processes, and in the building industry. They can be used in the form best suited for the purpose for which they are required, e.g. in the load or unloaded condition, optionally in the form of solutions or emulsions, as coating agents, lacquers, as moulding materials, sinter powders, dip resins, casting resins, injection-moulding compositions, impregnation resins and bonding agents, adhesives, as tool resins, laminating resins, sealing materials and fillers, floor-covering materials, and bonding agents for mineral aggregates.

Where otherwise not stated in the following examples, the term "parts" denotes parts by weight, and percentages signify percent by weight. Parts by volume and parts by weight have the same ratio to each other as millimeter and gram.

With regard to the mechanical and electrical properties of the curable mixtures described in the following examples, plates of the size 92 x 41 x 12 mm. were prepared for the determination of bending strength, deflection impact strength and water absorption. The specimens (60 x 10 x 4 mm.) for the determination of water absorption and for the bending and impact test (VSM 77103 and VSM 77105) were cut out from the plates.

For determination of dimensional stability in the heat according to Martens (DIN 53,458), specimens were cast in each case having the dimensions 120 x 15 x 10 mm.

Plates of the dimensions 120 x 120 x 4 mm. were cast for the testing of arc resistance and tracking resistance (VDE 0303).

(A) PRODUCTION EXAMPLES

Example 1

A solution of 94 g. of β,β'-bis[1-(2'-carboxyethyl)-5,5-dimethylhydantoinyl-3]-diethyl ether (0.2 mole) and 1.0 g. of tetramethylammonium chloride in 555 g. of epichlorohydrin (6.0 moles) is stirred at 90° C. The pH of the solution (glass electrode) is 5.0. The solution is stirred for 25 minutes at 90° C., whereby the pH increases to 9.3.

An azeotropic circulatory distillation is afterwards performed with a bath temperature of 140° C. and a vacuum of 75–90 torr, so that, with vigorous circulation, an internal temperature of 60° C. obtains. An addition is made dropwise in the course of 4 hours, with vigorous stirring, of 40 g. of 50% aqueous sodium hydroxide solution. The water present in the reaction mixture is in the process continuously removed from the system and separated. Distillation is continued afterwards for a further 45 minutes for the removal of the last traces of water.

The solution is cooled to room temperature, the sodium chloride formed during the reaction is separated and the solution washed out with 100 ml. of water. The organic phase is then concentrated at 60° C. in a rotary evaporator under a slight vacuum, and then dried at 80° C./0.2 torr until constant weight is established.

In this manner are obtained 102 g. of a light-brown viscous resin (yield: 87.4% of the theoretical amount) which contains 3.09 epoxide equivalents/kg. (90.1% of the theoretical amount). The total chlorine content is 1.1%.

The product consists essentially of the diglycidyl ester having the following structure:

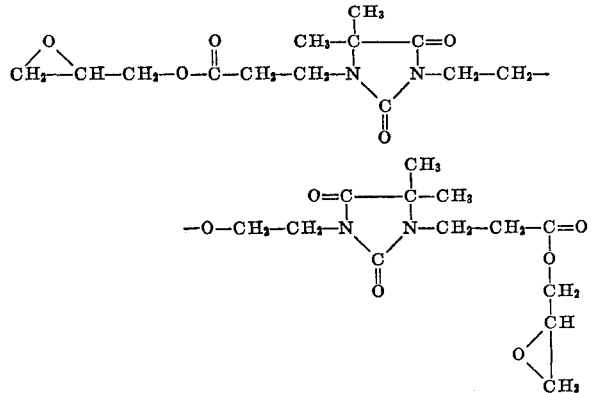

Example 2

In the manner described in Example 1, a solution of 82.5 g. of 1,1'-methylene-bis-[3-(β-carboxyethyl)-5,5-dimethylhydantoin] (0.2 mole) and 1.0 g. of tetramethylammonium chloride in 555 g. of epichlorohydrin (6.0 moles) is reacted with 40.0 g. of 50% aqueous sodium hydroxide solution.

Dehydrohalogenation and likewise the processing procedure are carried out analogously to Example 1.

An amount of 100.5 g. of clear, highly-viscous yellow resin (yield: 96.5% of the theoretical amount) is obtained, the epoxide content of which amounts to 3.31 equivalents/kg. (86.5% of the theoretical amount).

The product consists essentially of the diglycidyl ester having the following structure:

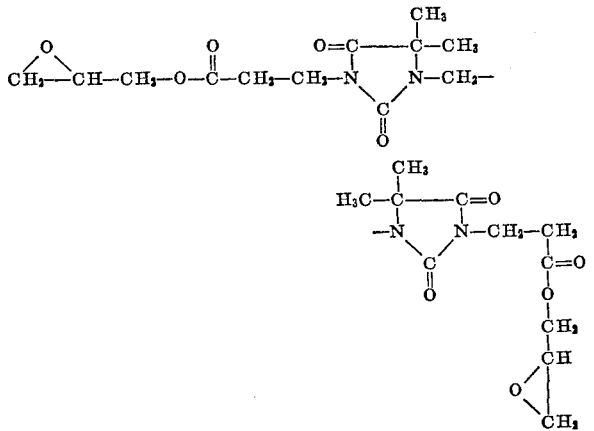

Example 3

As described in Example 1, 96.5 g. of 1,6-bis-[1'-(β-carboxyethyl) - 5',5' - dimethylhydantoin-3'] - hexane (0.2 mole) and 1 g. of tetramethylammonium chloride are dissolved in 555 g. of epichlorohydrin, and dehydrohalogenated with 40 g. of 50% aqueous sodium hydroxide solution, according to Example 1.

After a processing procedure analogous to that described in Example 1, 115.8 g. (yield: 97.3% of the theoretical amount) of a viscous, clear light-brown resin are obtained, the said resin having an epoxide content of 3.03 equivalents/kg. (90.2% of the theoretical amount). The total chlorine content amounts to 1.4%.

The product consists essentially of the diglycidyl ester of the formula:

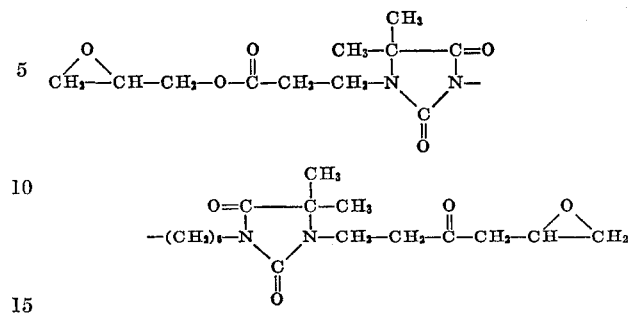

EXAMPLE 4

In the manner described in Example 1, 16.3 g. of 1,1'-methylene-bis-[3-(β-carboxyethyl) - 5 - isopropylhydantoin] and 0.2 g. of tetramethylammonium chloride in 75.8 g. of epichlorohydrin are reacted with 8.2 g. of 50% aqueous sodium hydroxide solution. Dehydrohalogenation too is performed analogously to Example 1. In this way are obtained 22.5 g. of a clear, brown, highly viscous resin having an epoxide content of 3.16 equivalents/kg. (87.1% of the theoretical amount).

The product consists essentially of the diglycidyl ester having the following structure:

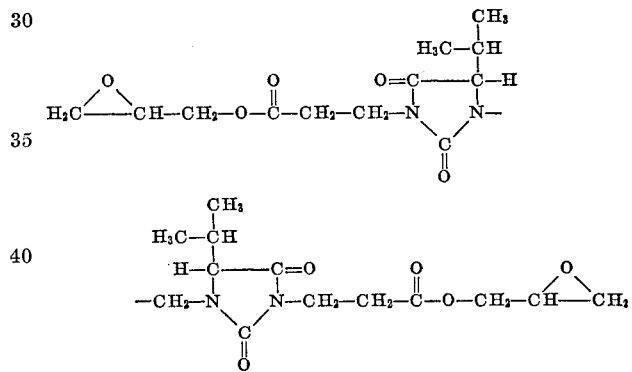

EXAMPLE 5

In the manner described in Example 1, 26.8 g. of 1,1'-methylene-bis-[3-(β-carboxyethyl) - 5,5 - dimethyl-5,6-dihydrouracil] are reacted, in the presence of 0.2 g. of tetramethylammonium chloride, with 101.2 g. of epichlorohydrin. Dehydrohalogenation is performed according to Example 1 with 10.9 g. of 50% aqueous sodium hydroxide solution, under the conditions described therein.

An amount of 30 g. of a reddish, highly viscous resin is obtained having an epoxide content of 2.80 equivalents/kg. (77.5% of the theoretical amount). The product consists essentially of the diglycidyl ester of the following structure.

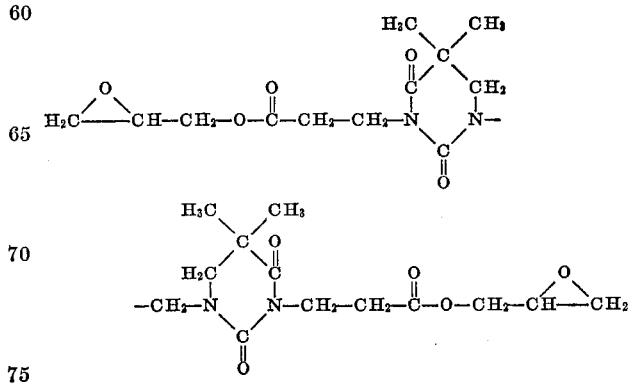

(B) APPLICATION EXAMPLES

Example I 70 parts of the diglycidyl ester prepared according to Example 1 with an epoxide content of 3.09 epoxide equivalents/kg. are worked up, at 80° C., with 28.5 parts of hexahydrophthalic acid anhydride to obtain a clear, homogeneous melt.

This is poured into aluminium moulds preheated to 120° C., and cured according to the following cycle: in 2 hours at 120° C. and 20 hours at 150° C. The thus obtained clear transparent, light-brown colored specimens have the following properties:

Bending strength (VSM 77103): 12.8–14.3 kp./mm.$^2$
Deflection (VSM 77103): 10.5–11.3 mm.
Impact strength (VSM 77105): 7.2–9.8 cm. kp./cm.$^2$

Example II 100 parts of the diglycidyl ester prepared according to Example 2 having an epoxide content of 3.31 epoxide equivalents/kg. are worked up with 47.2 parts of hexahydrophthalic acid anhydride, as described in Example 1, to obtained moulded specimens; these possess the following properties:

Bending strength (VSM 77103): 13.5–16.3 kp./mm.$^2$
Deflection (VSM 7703): 10.5–11.3 mm.
Impact strength (VSM 77105): 9.5–11.0 cm. kp./cm.$^2$
Dimensional stability in the heat according to Martens DIN 53458): 87° C.
Boiling water absorption (1 hour/100° C.): 0.99%

Example III 100 parts of the diglycidyl ester prepared according to Example 3 having an epoxide content of 3.03 epoxide equivalents/kg. are worked up with 39.7 g. of hexahydrophthalic acid anhydride, as described in Example I, to obtained mould-specimens; these possess the following properties:

Bending strength (VSM) 77103): 11.9–13.6 kp./mm.$^2$
Deflection (VSM 77103): 11.2–14.7 mm.
Impact strength (VSM 77105): 11.1–17.7 cm. kp./cm.$^2$
Dimensional stability in the heat according to Martens (DIN): 67° C.
Tracking resistance (VDE 0303): KA 3c (stage)
Are resistance (VDE) 0303): L 4 (stage)

We claim:

1. A diglycidyl ester of the formula selected from the group consisting of (A) [structural formula]

(B) [structural formula]

(C) [structural formula]

wherein
$X_1$ and $X_2$ are the same and each is hydrogen or methyl;
$R_1$ and $R_2$ are hydrogen or lower alkyl of 1 to 4 carbon atoms;
$R_5$, $R_6$ and $R_7$ are hydrogen or lower alkyl of 1 to 4 carbon atoms; and
A is alkylene of 1 to 12 carbon atoms or lower alkylene interrupted by one oxygen atom.

2. Diglycidyl ester according to claim 1 which are of the formula:

[structural formula]

3. Diglycidyl ester according to claim 1 which are of the formula:

[structural formula]

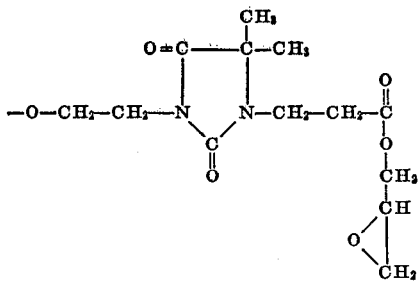

4. Diglycidyl ester according to claim 1 which are of the formula:

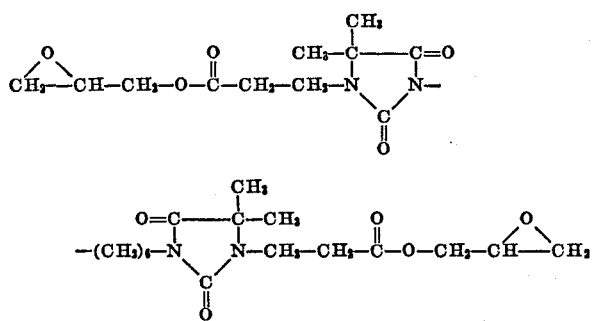

5. Diglycidyl ester according to claim 1 which are of the formula:

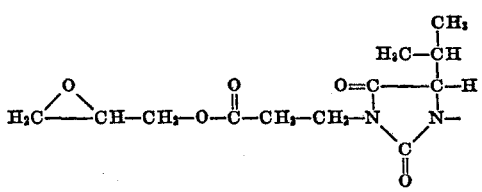

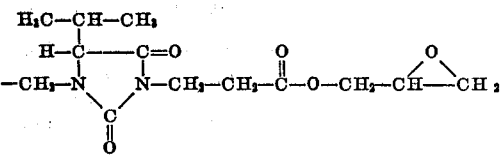

6. Diglycidyl ester according to claim 1 which are of the formula:

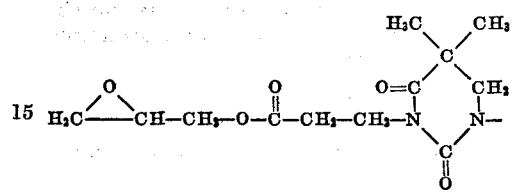

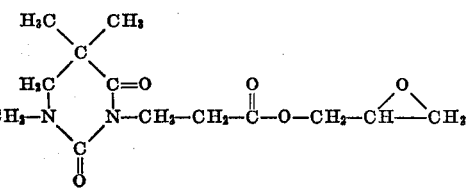

References Cited
UNITED STATES PATENTS

| | | | |
|---|---|---|---|
| 3,391,097 | 7/1968 | Williamson | 260—309.5 |
| 3,449,353 | 6/1969 | Porret et al. | 260—309.5 |
| 3,542,803 | 11/1970 | Porret | 260—309.5 |
| 3,591,590 | 7/1971 | Haug et al. | 260—260 |
| 3,592,823 | 7/1971 | Porret | 260—309.5 |
| 3,644,365 | 2/1972 | Habermeier et al. | 260—260 |
| 3,629,263 | 12/1971 | Batzer et al. | 260—309.5 |
| 3,676,455 | 7/1972 | Haug et al. | 260—309.5 |
| 3,679,681 | 7/1972 | Habermeier et al. | 260—309.5 |

NATALIE TROUSOF, Primary Examiner

U.S. Cl. X.R.

260—2 EP, 2 EA, 2 EC, 18 EP, 30.4 EP, 37 EP, 78.4 EP, 309.5, 824, 830 TW, 830 R, 830 S, 831, 834, 836